United States Patent
Hayes et al.

(10) Patent No.: US 6,199,715 B1
(45) Date of Patent: Mar. 13, 2001

(54) DISPOSABLE FOIL CONTAINER

(75) Inventors: Thomas J. Hayes, McHenry; J. Scott Dellinger, Buffalo Grove, both of IL (US)

(73) Assignee: Tenneco Packaging Specialty And Consumer Products, Inc., Lake Forest, IL (US)

( * ) Notice: Subject to any disclaimer, the term of this patent is extended or adjusted under 35 U.S.C. 154(b) by 0 days.

(21) Appl. No.: 09/244,269

(22) Filed: Feb. 3, 1999

(51) Int. Cl.$^7$ ............................... B65D 1/00; A47J 27/00
(52) U.S. Cl. .................. 220/608; D7/553.6; 206/564; 220/573.1; 229/5.82; 426/113
(58) Field of Search .................... 206/562–564, 206/557; 229/5.82; 220/574, 575, 608, 623, 573.1, 500, 527; 426/113, 126; D7/550.1, 553.1, 553.2, 553.6, 553.7, 554.1, 554.2, 554.4, 555

(56) References Cited

U.S. PATENT DOCUMENTS

| | | | |
|---|---|---|---|
| D. 147,909 | * 11/1947 | Kleinberg | D7/553.7 |
| D. 170,237 | * 8/1953 | Randall | 206/564 X |
| D. 177,360 | 4/1956 | Becker et al. . | |
| D. 198,290 | 5/1964 | Miller et al. . | |
| D. 200,249 | * 2/1965 | Hancock | 220/500 X |
| D. 209,605 | 12/1967 | Zoeller et al. . | |
| D. 226,775 | 4/1973 | Jones et al. . | |
| D. 235,498 | * 6/1975 | Day | D7/553.3 |
| D. 237,679 | * 11/1975 | Backus | D7/553.3 |
| D. 241,109 | 8/1976 | Levin . | |
| D. 249,234 | 9/1978 | Limon et al. . | |
| D. 249,238 | 9/1978 | Limon et al. . | |
| D. 270,703 | 9/1983 | El-Hag et al. . | |
| D. 273,181 | 3/1984 | Braddon . | |
| D. 280,589 | 9/1985 | Bassett . | |

(List continued on next page.)

FOREIGN PATENT DOCUMENTS

1203349 * 8/1970 (GB) ........................... 206/564

OTHER PUBLICATIONS

Brochure entitled Ekcotherm Specification "Ovenable Paperboard Containers" (Date Unknown).

*Primary Examiner*—Allan N. Shoap
*Assistant Examiner*—Joe Merek
(74) *Attorney, Agent, or Firm*—Jenkens & Gilchrist (57) ABSTRACT

A disposable foil container formed from a single sheet of metal comprises a bottom panel, a continuous wall panel, and a continuous rim. The bottom panel includes an upwardly-projecting rib configuration wherein a peripheral rib, having first and second opposing side curved sections and first and second opposing end curved sections, encompasses a pair of traversing ribs, first and second returning ribs, and a central portion of the bottom panel. Each curved traversing rib extends towards the central portion, has a first end intersecting with said first side curved section, and has a second end intersecting with said second side curved section at a first set of intersections. Each traversing rib is bisected into substantially equal parts by a major axis. The first returning rib has first and second ends intersecting said first side curved section and the second returning rib has first and second ends intersecting said second curved section at a second set of intersections. Each returning rib is bisected into equal parts by a minor axis. All of the ribs have rounded tops. The first and second set of intersections form smooth curvilinear corners and have a minimized flat top surface areas to prevent rib deformation.

27 Claims, 5 Drawing Sheets

U.S. PATENT DOCUMENTS

| | | |
|---|---|---|
| D. 280,590 | 9/1985 | Schrage . |
| D. 280,591 | 9/1985 | Schrage . |
| D. 282,520 | 2/1986 | Schrage . |
| D. 284,514 | 7/1986 | McPoyle . |
| D. 287,809 | 1/1987 | Alexander . |
| D. 288,055 | 2/1987 | Alexander . |
| D. 293,999 | 2/1988 | Grindrod et al. . |
| D. 333,944 | 3/1993 | Denzin et al. . |
| D. 375,652 | 11/1996 | Hayes . |
| D. 392,884 | 3/1998 | Hayes . |
| 202,939 * | 4/1878 | Frost et al. ............................ 220/574 |
| 983,473 | 2/1911 | Barnes . |
| 1,462,640 | 7/1923 | Hoffman . |
| 1,608,046 | 11/1926 | Stanley . |
| 1,685,116 * | 9/1928 | Barchoff ............................... 220/575 |
| 1,890,936 * | 12/1932 | Douglass ........................... 220/623 X |
| 1,950,376 | 3/1934 | Alexander . |
| 1,957,639 * | 5/1934 | Goodwin ............................... 220/623 |
| 2,036,572 | 4/1936 | Frost . |
| 2,066,025 | 12/1936 | Zublin et al. . |
| 2,143,554 | 1/1939 | Harper . |
| 2,170,040 | 8/1939 | Stuart . |
| 2,237,535 | 4/1941 | Wahl . |
| 2,549,440 * | 4/1951 | Erro ................................. 220/575 X |
| 2,738,915 * | 3/1956 | Clair ................................. 220/575 X |
| 2,802,411 | 8/1957 | Riener . |
| 3,082,906 | 3/1963 | Reed . |
| 3,098,597 * | 7/1963 | Johnson et al. .................... 220/573.1 |
| 3,140,796 * | 7/1964 | Broida .................................. 220/608 |
| 3,219,229 | 11/1965 | Kaufman . |
| 3,233,812 | 2/1966 | Kennedy . |
| 3,233,813 | 2/1966 | Wolford et al. . |
| 3,250,419 * | 5/1966 | O'Brien et al. ....................... 220/574 |
| 3,659,585 | 5/1972 | Bay . |
| 3,858,786 * | 1/1975 | Vogt ............................... 220/657 X |
| 3,958,504 | 5/1976 | Levin . |
| 4,014,450 | 3/1977 | Girotti et al. . |
| 4,113,095 | 9/1978 | Dietz et al. . |
| 4,167,233 | 9/1979 | Hare . |
| 4,442,969 | 4/1984 | Holden . |
| 4,616,762 | 10/1986 | Alexander . |
| 4,717,038 | 1/1988 | Anders . |
| 4,817,812 | 4/1989 | Sarnoff et al. . |
| 4,852,760 | 8/1989 | Ott et al. . |
| 4,883,195 | 11/1989 | Ott et al. . |
| 4,969,569 | 11/1990 | Anders . |
| 4,971,216 | 11/1990 | Fortune . |
| 5,029,721 | 7/1991 | Timpe . |
| 5,050,791 | 9/1991 | Bowden et al. . |
| 5,361,687 | 11/1994 | deVries . |
| 5,628,427 | 5/1997 | Hayes . |
| 6,065,629 * | 5/2000 | Sarnoff et al. ....................... 220/315 |
| 6,076,876 * | 6/2000 | Letourneau et al. ................. 294/143 |

\* cited by examiner

DISPOSABLE FOIL CONTAINER

FIELD OF THE INVENTION

The present invention relates generally to disposable foil containers and, more particularly, relates to a disposable foil container designed to provide superior structural strength.

BACKGROUND OF THE INVENTION

Various disposable and inexpensive cooking utensils, such as containers for use in heating and/or cooking food products, such as hams, roasts, turkeys, etc., have become popular because they are relatively inexpensive and eliminate the need for container cleaning after the heating and/or cooking of the food product has occurred. Such containers are normally formed of a light or thin gauge material such as aluminum foil. Foil containers made from aluminum foil have the heat transference qualities associated with the metal aluminum and because of the minimal amount of metal utilized in the structure, are inexpensive and, consequently, can be disposed of after a single use.

The convenience of having an inexpensive disposable container by utilizing thin gauge metal is achieved with the attendant factor that the container has diminished structural strength. One measure of the structural strength of the container is known as the "bend strength." The "bend strength" may be defined as the maximum weight which can be lifted by the container prior to the formation of one or more deflection points in the container. A deflection point refers to the formation of a buckle along one of the sides of the container. Thin gauge foil containers are inherently weak and are incapable of carrying heavy loads without bending. Obviously, if the gauge of the metal is increased to increase the "bend strength" of the container, the container cost will also increase.

To achieve added structural strength without increasing the metal gauge and, at the same time, enhance the aesthetic appeal of the container, it is customary to form ribs of varying sizes and designs in the bottom panel and sides of a container. However, the number, shape, and size of the ribs are limited by the elongation capacity of the type of metal and gauge selected. A gauge that is too thin may result in the tearing of the foil as it is formed while a gauge that is too thick may be too difficult to form around complex shapes and sharp angles. Also, the number and depth of the ribs is limited by the elongation capacity, and a tradeoff between the number, shape, and size of the ribs is usually required.

Also, controlled wrinkles or folds are often incorporated in the sides, and the rim of the container is curled or beaded in a variety of ways to increase the overall structural strength of the container. Heretofore, these strength-enhancing features have been generally successful in producing inexpensive and aesthetically-acceptable disposable foil containers suitable for steaming, heating, and/or cooking food products. However, additional strengthening means are still desirable, especially in the bottom panel of larger containers such as those used for cooking heavy loads such as roasts, hams, and turkeys.

SUMMARY OF THE INVENTION

The present invention is a disposable container formed from a single sheet of metal. In accordance with one embodiment, the container includes a bottom panel having a peripheral rib enclosing an interior panel having a central portion, first and second curved traversing ribs, and first and second curved returning ribs. The peripheral rib has first and second side curved sections and first and second end curved sections. Each of the traversing ribs extends toward the central portion and includes a first end and a second end. Both first and second ends of each traversing rib intersect the peripheral rib at a first set of intersections. Each of the returning ribs extends toward the central portion and includes a first and a second end. Both first and second ends of each returning rib intersect the peripheral rib at a second set of intersections.

The container further includes a continuous wall panel encompassing the bottom panel and extending upwardly and outwardly from the bottom panel. The continuous wall panel, which has a continuous curvilinear upper edge, forms a pair of opposing side walls and a pair of opposing end walls.

Also, the container is defined about major and minor axes. The major axis passes through the center of the bottom panel and is located approximately halfway between the opposing side walls of the continuous wall panel and approximately halfway between the side curved sections of the peripheral rib. The minor axis passes through the center of the bottom panel and is located approximately halfway between the opposing end walls of the continuous wall panel and approximately halfway between the end curved sections of the peripheral rib. The major axis substantially bisects the end curved sections, and the minor axis substantially bisects the side curved sections.

In accordance with another embodiment, the container formed from a single sheet of metal includes a bottom panel having first, second, and third ribs. Each of the ribs have a first lower edge, a first upper edge, a second lower edge, a second upper edge, a first surface between the first lower edge and the first upper edge, and a second surface between the second lower edge and the second upper edge. The first, second, and third ribs form a 3-way rib intersection having a flat top surface. At a first smooth transition, the first surface of the first rib interconnects with the first surface of the second rib, the first lower edge of the first rib interconnects with the first lower edge of the second rib, and the first upper edge of the first rib interconnects with the first upper edge of the second rib. At a second smooth transition, the second surface of the second rib interconnects with the second surface of the third rib, the second lower edge of the second rib interconnects with the second lower edge of the third rib, and the second upper edge of the second rib interconnects with the second upper edge of the third rib. At a third smooth transition, the first surface of the third rib interconnects with the second surface of the first rib, the first lower edge of the third rib interconnects with the second lower edge of the first rib, and the first upper edge of the third rib interconnects with the second upper edge of the first rib. The flat top surface is encompassed by the second upper edge of the second rib intersecting with the second upper edge of the third rib at the second smooth transition, the first upper edge of the third rib intersecting with the second upper edge of the first rib at the third smooth transition, and the first upper edge of the first rib intersecting with the first upper edge of the second rib at the first smooth transition.

In accordance with yet another embodiment, the container includes a bottom panel, a continuous wall panel encompassing the bottom panel and extending upwardly and outwardly from the bottom panel. The continuous wall panel forms a pair of opposing side walls, and a pair of opposing end walls. Four corners bridge the side walls and end walls. The pair of side walls includes curvilinear upper side edges having respective radii of curvature. The pair of end walls includes curvilinear upper end edges having respective radii of curvature. Each of the four corners include curvilinear upper corner edges having respective radii of curvature. A continuous rim encompasses an upper edge of the continuous wall panel and projects laterally outwardly therefrom. The continuous rim forms a pair of side rim portions connected to the upper side edges of respective ones of the pair of side walls. The pair of side rim portions have respective inner edges curved on the curvilinear upper side edges of respective ones of the side walls. The side rim portions have respective side outer edges that include three straight segments interconnected at side corners. The continuous rim forms a pair of end rim portions connected to the upper end edges of respective ones of the pair of end walls. The pair of end rim portions have respective inner edges curved on the curvilinear upper end edges of respective ones of the end walls. The end rim portions have respective straight end outer edges.

BRIEF DESCRIPTION OF THE DRAWINGS

Other objects and advantages of the invention will become apparent upon reading the following detailed description and upon reference to the drawings in which.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1:
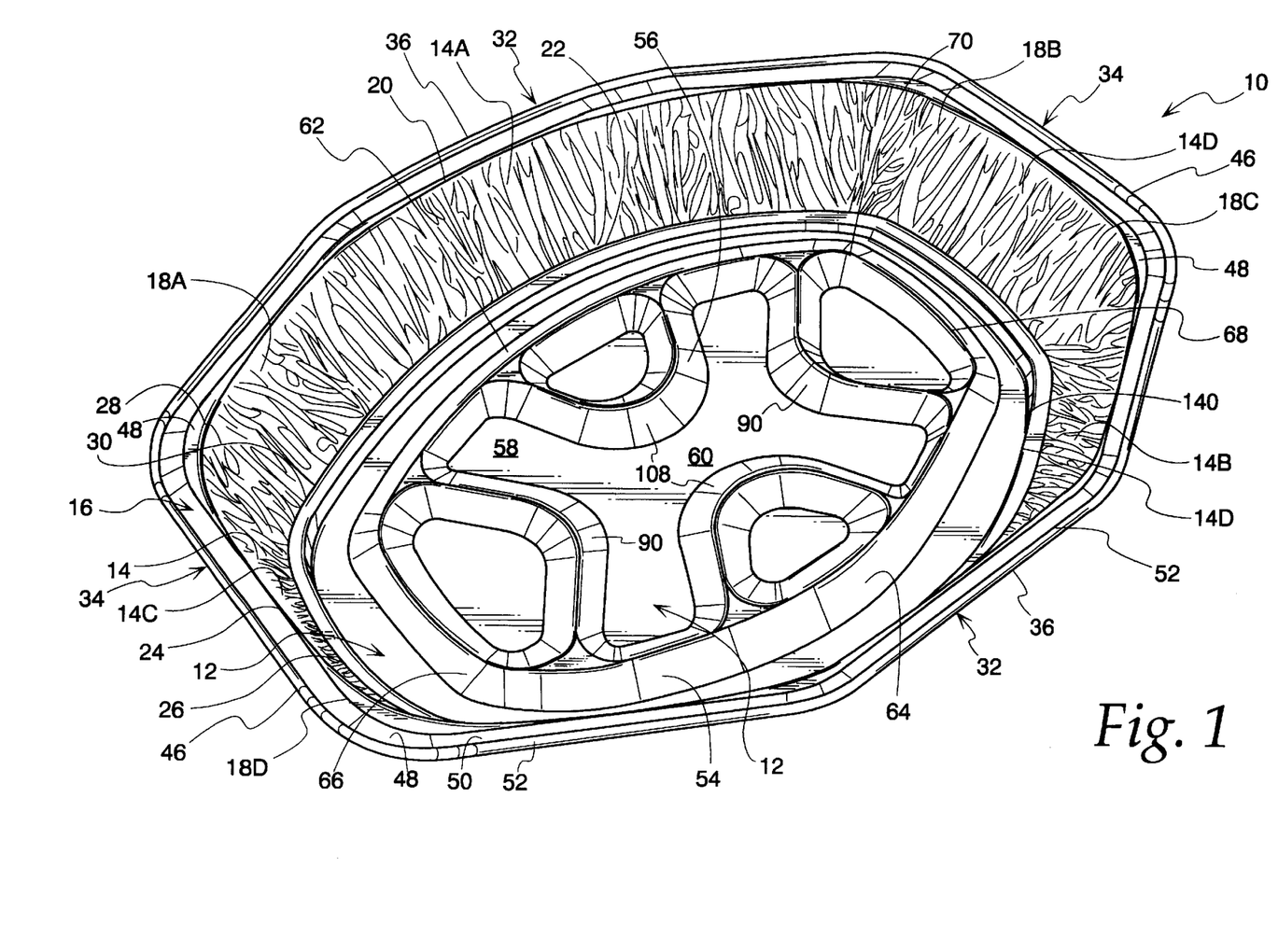
FIG. 1 is an isometric view of a disposable foil container embodying the present invention.
Figure 2:
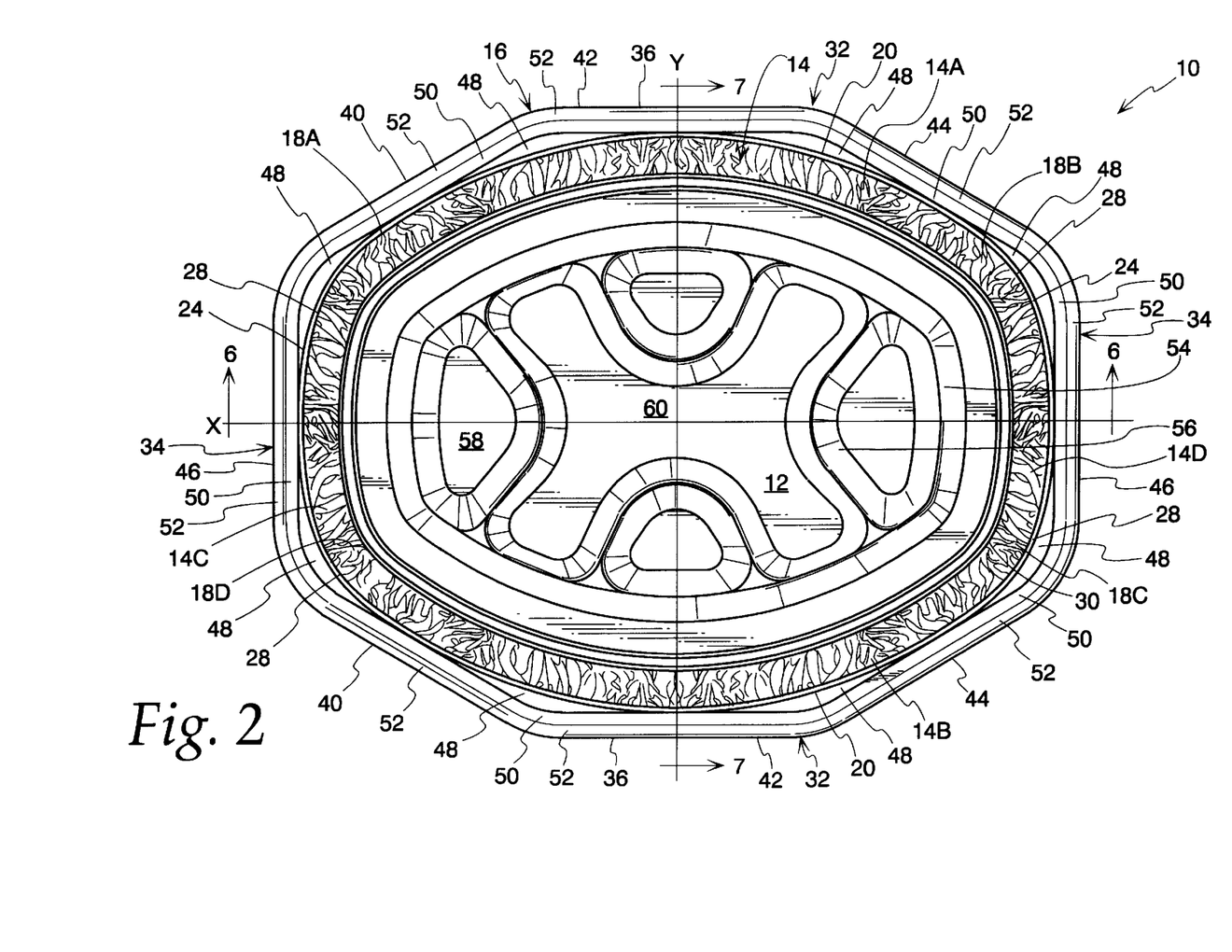
FIG. 2 is a top view of the disposable foil container in FIG. 1.

Turning now to the drawings, FIGS. 1–7 illustrate a disposable foil container 10 formed about orthogonal major (longer) and minor (shorter) axes. In FIG. 2, the major axis is labeled X, and the minor axis is labeled Y. The container 10 is symmetrical and like reference numerals are used to designate like parts.

With particular reference to FIG. 1, the foil container 10 is formed from a single sheet of thin gauge metal such as aluminum foil. If the selected metal is aluminum foil, it is preferably Al 3003 with a gauge preferably in the range from approximately 0.0030 inches to approximately 0.0080 inches. The aluminum may either be dead soft or hardened aluminum. A preferred hardness rating is soft "O" on the ASTM scale.

The foil container 10 includes a bottom panel 12, a continuous wall panel 14, to and a continuous rim 16. The continuous wall panel 14 encompasses the bottom panel 12 and extends upwardly and outwardly from the bottom panel 12. The continuous rim 16 encompasses an upper edge of the continuous wall panel 14 and projects laterally outwardly therefrom.

The continuous wall panel 14 with wrinkles forms a pair of opposing side walls 14a and 14b, and a pair of opposing end walls 14c and 14d. The end walls 14c and 14d extend between the side walls 14a and 14b. Four corners 18a, 18b, 18c, and 18d bridge the end and side walls. Each of the side walls 14a and 14b includes curvilinear upper and lower edges 20 and 22 having respective radii of curvature. Similarly, each of the end walls 14c and 14d include curvilinear upper and lower edges 24 and 26 having respective radii of curvature. Each of the four corners 18a, 18b, 18c, and 18d includes curvilinear upper and lower corner edges 28 and 30 having respective radii of curvature. The upper edges 20, 24, 28 taken together do not form a perfect oval.

The disposable foil container 10 includes various features which enhance the structural rigidity of the container 10. First is the configuration of the continuous rim 16. With particular reference to FIG. 2, the continuous rim 16 forms a pair of side rim portions 32 integrally formed with the upper edges 20 of the side walls 14a and 14b. Likewise, the continuous rim 16 forms a pair of end rim portions 34 integrally formed with the upper edges 24 of end walls 14c and 14d.

Each side rim portion 32 has an inner edge curved on the curvilinear upper edge 20 and has a side outer edge 36. Each side outer edge 36 includes three interconnected substantially straight segments 40, 42, 44 having lengths of approximately 5.2, 4.6, and 5.2 inches, respectively. Likewise, each end rim portion 34 has an inner edge curved on the curvilinear upper edge 24 and has an end outer edge 46 with a length of approximately 4.3 inches. The shape of each of the end rim portions 34 may be described as concavo-straight where the inner edge is concave relative to the interior of the container and the outer edge is straight.

The side and end outer edges 36, 46 are interconnected in the general shape of an octagon wherein the opposite edges are substantially parallel. When the container 10 is lifted by the end rim portions 34, in particular, along end outer edges 46, anti-deflection support is partially provided by side rim portions 32, in particular, along segments 42 and vector portions of segments 40 and 44 parallel to the major axis X. Similarly, when the container 10 is lifted by the side rim portions 32, in particular, along segments 42, anti-deflection support is partially provided by end rim portions 34, in particular along end outer edges 46, and side rim portions 32, in particular, vector portions of segments 40 and 44 parallel to the minor axis Y. The octagonal shape provides beam support while at the same time maximizing volumetric capacity and reducing material costs.

The continuous rim 16 includes a substantially horizontal inner planar flange 48, a declining middle planar flange 50, and an outer reinforcing bead 52. The horizontal inner planar flange 48 projects laterally outwardly from the upper edge of the continuous wall panel 14. As best shown in FIG. 2, the inner section 48 is intermittently located, not continuously located, along the rim 16. More specifically, the horizontal inner planar flange 48 is located in eight separate regions of the rim 16. A first of these eight regions projects laterally outwardly from the upper edge 28 of the corner 18a proximate to the intersection of end outer edge 46 at end wall 14c and straight segment 40; a second of these regions projects laterally outwardly from the upper edge 20 of the side wall 14a proximate to the intersection of straight segments 40 and 42; a third of these regions projects laterally outwardly from the upper edge 20 of the side wall 14a proximate to the intersection of straight segments 42 and 44; a fourth of these sections projects laterally outwardly from the upper edge 28 of the corner 18b proximate to the intersection of the straight segment 44 and end outer edge 46 at end wall 14d; the fifth of these regions projects laterally outwardly from the upper edge 28 of the corner 18c proximate to the intersection of end outer edge 46 at end wall 14d and straight segment 44 at side wall 14b; a sixth of these regions projects laterally outwardly from the upper edge 20 of the side wall 14b proximate to the intersection of straight segments 44 and 42; a seventh of these regions projects laterally outwardly from the upper edge 20 of the side wall 14b proximate to the intersection of straight segments 42 and 40; and the eighth of these regions projects laterally outwardly from the upper edge 28 of the corner 18d proximate to the intersection of straight segment 40 and end outer edge 46 at end wall 14c. The inner planar flange 48 does not project laterally outwardly from the upper edges 20 of the side walls 14a and 14b at a location proximate to the mid points of straight segments 40, 42, and 44 or from the upper edges 24 of the end walls 14c and 14d at a location proximate to the mid points of end outer edges 46.

The declining middle planar flange 50 is continuously located along the rim 16. The continuous middle planar flange 50 encompasses the inner planar flange 48 and is declined at an angle of approximately 15° relative to the horizontal inner planar flange 48 (see FIGS. 6 and 7). The width of the continuous middle planar flange 50 is generally constant along the rim 16. The declining middle planar flange 50 of the rim 16 allows the foil container 10 to resist bending when it is lifted by the rim 16, thereby improving the pickup strength of the foil container 10.

The reinforcing bead 52 may be in the form of a tight coil which is continuous and encompasses the middle planar flange 50 of the rim 16. The bead 52 is integrally formed with the middle planar flange 50 and has a curl diameter of approximately 0.25 inch. As is well known in the art, curling or beading the rim 16 to create the tubular beam-like bead 52 increases the overall structural rigidity of the container 10.

Figure 3:
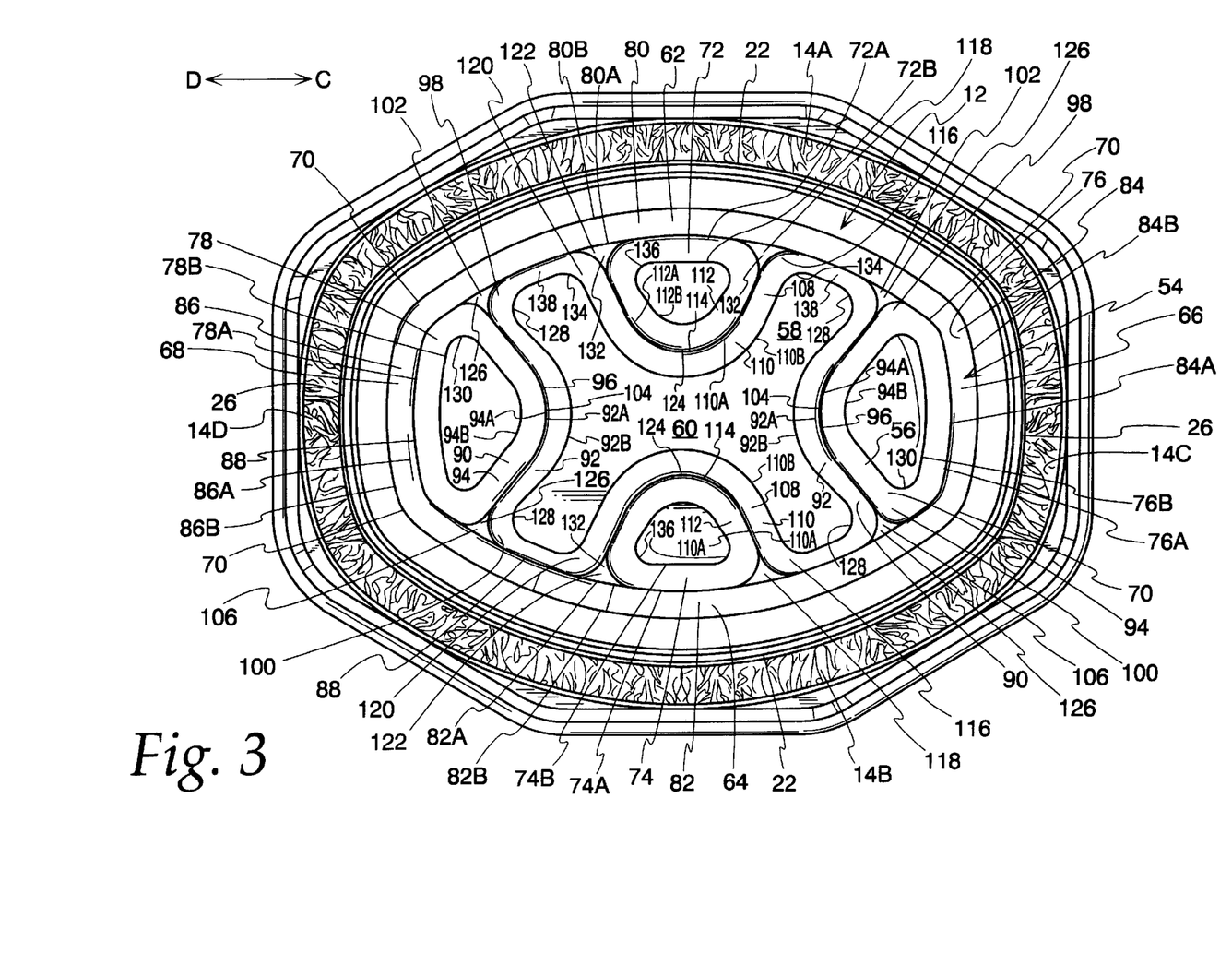
FIG. 3 is a bottom view of the disposable foil container in FIG. 1.
Figure 4:
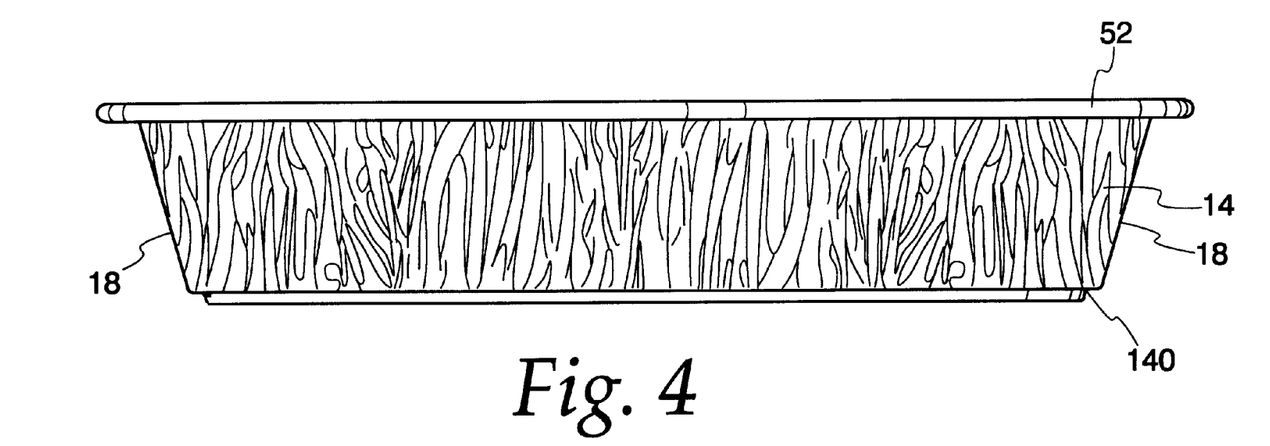
FIG. 4 is an side view of the disposable foil container in FIG. 1.
Figure 5:
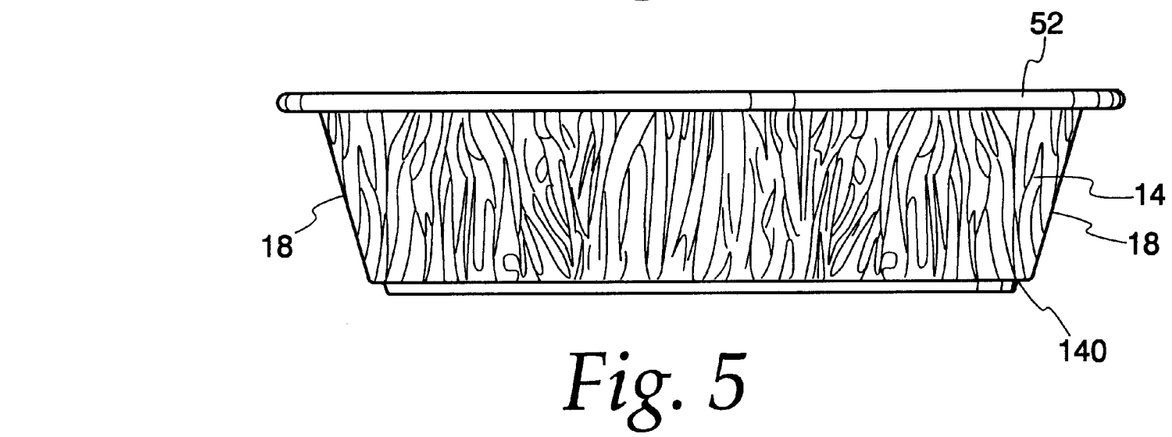
FIG. 5 is a end view of the disposable foil container in FIG. 1.
Figure 6:
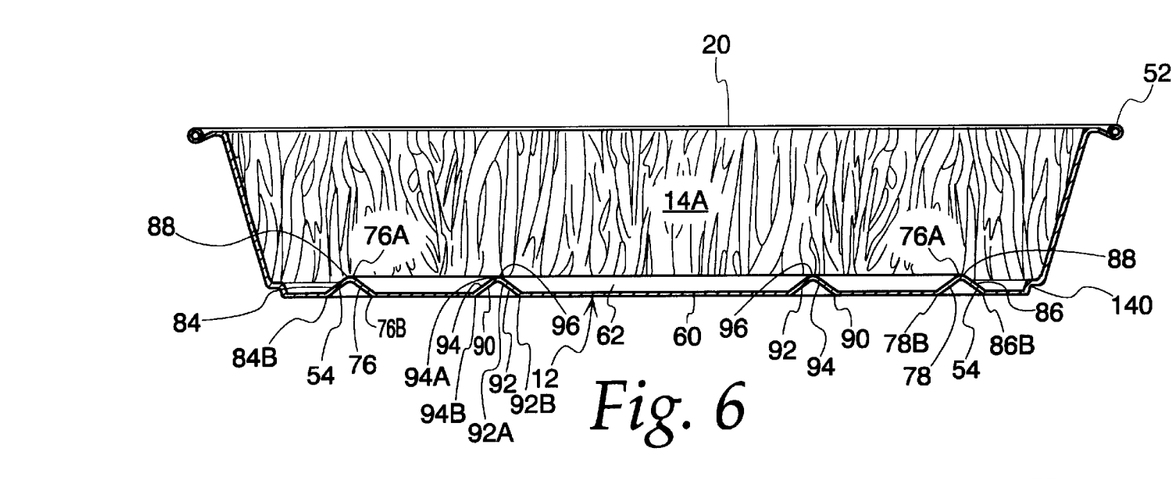
FIG. 6 is a section taken generally along the line 6—6 in FIG. 2.
Figure 7:
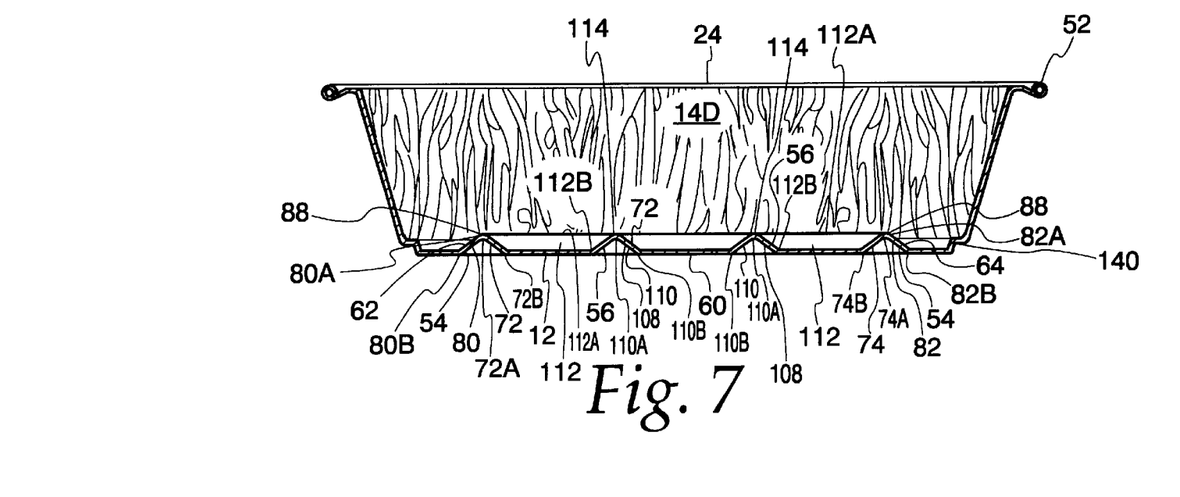
FIG. 7 is a section taken generally along the line 7—7 in FIG. 2.

Another important feature adding to the structural rigidity, and therefore the bend strength, of the foil container 10 is the rib configuration formed in the bottom panel 12. As best shown in FIGS. 1–3, the bottom panel 12 forms a centrally-located peripheral rib 54 intersecting with a plurality of interior ribs 56 extending upwardly a distance of approximately 0.375 inches from a lowermost planar surface of the bottom panel 12 as shown in FIG. 6 and 7. High ribs are desirable to lift and cradle the food product placed inside the container to promote uniform cooking, yet a multiplicity of ribs that are too high cannot be formed due to the maximum tensile elongation capacity of the chosen gauge of aluminum. The peripheral rib 54 encloses an interior panel 58 having a central portion 60 of the bottom panel 12 in which the interior ribs 56 are located.

Returning to FIG. 3, the peripheral rib 54 includes opposing side curved sections 62 and 64 defining respective curves generally parallel to the lower edges 22 of the respective side walls 14a and 14b. The peripheral rib 54 also includes opposing end curved sections 66 and 68 defining respective curves generally parallel to the lower edges 26 of the respective end walls 14c and 14d. The side curved sections 62, 64 are interconnected to the end curved sections 66, 68 at corners 70. The major axis X of the container 10 passes through the center of the bottom panel 12 and is located halfway between the side walls 14a and 14b and halfway between the opposing side curved sections 62 and 64. The minor axis Y of the container 10 passes through the center of the bottom panel 12 and is located halfway between the end walls 14c and 14d and halfway between the opposing end curved sections 66 and 68.

The peripheral rib 54 includes inner surfaces 72, 74, 76, 78 and outer surfaces 80, 82, 84, 86 corresponding to the curved sections 62, 64, 66, 68, respectively. The inner surfaces 72, 74, 76, 78, which generally face the central portion 60 of the bottom panel 12, include respective upper edges 72a, 74a, 76a, 78a and respective lower edges 72b, 74b, 76b, 78b. Similarly, the outer surfaces 80, 82, 84, 86, which generally face away from the central portion 60 of the bottom panel 12, include respective upper edges 80a, 82a, 84a, 86a and lower edges 80b, 82b, 84b, 86b.

At locations where the peripheral rib 54 is not intersected by an interior rib 56, the upper edges 72a, 74a, 76a, 78a are interconnected with the respective upper edges 80a, 82a, 84a, 86a respectively at a full radius peak 88 having a radius of curvature of approximately 1/16 to 3/8 inch. A larger radius of curvature would generally result in an undesirable flattened peak.

As shown in FIG. 3 and FIG. 6, interior to the peripheral rib 54 are a pair of curved traversing ribs 90. Each traversing rib 90 includes an inner surface 92 generally facing the central portion 60 of the bottom panel 12 and an outer surface 94 facing away from the central portion 60 of the bottom panel 12. The inner and outer surfaces 92, 94 of a traversing rib 90 include respective upper edges 92a, 94a and respective lower edges 92b, 94b. At points of non-intersection, the upper edge 92a of the inner surface 92 interconnects with the upper edge 94a of the outer surface 94 at a full radius peak 96 having a radius of curvature of approximately 1/16 to 3/8 inch.

Each traversing rib 90 has an a first end 98 and a second end 100. The first end 98 of a traversing rib 90 preferably intersects the side curved section 62 of the peripheral rib 54 at an intersection 102 adjacent to corner 70. The traversing rib 90 extends toward the central portion 60 of the bottom panel 12 and curves through a point of inflection 104 before the second end 100 preferably intersects the opposite side curved section 64 at an intersection 106 adjacent to corner 70. Preferably, the traversing rib 90 bridges the interior panel 58 from curved section 62 to curved section 64. Alternatively, intersections 102 may be located at corners 70, as may intersections 106. Also, any combination of intersections 102, 106 of the traversing rib with either the side or end curved sections 62, 64, 66, 68, or corners 70 is possible without departing from the spirit and scope of the present invention.

The configuration of the traversing ribs 90 is such that the major axis X is substantially normal to lines tangent to each point of inflection 104. Also, the major axis X substantially bisects both end curved sections 66, 68 of the peripheral rib 54 and both traversing ribs 90. This configuration in which the major axis X crosses a total of four ribs provides enhanced beam strength to prevent buckling along the major axis X. At the point where the major axis X intersects the end curved sections 66, 68 of the peripheral 54 and traversing ribs 90, the width of each of these ribs as measured from the lower edge of its inner surface to the lower edge of its outer surface is approximately in the range of 0.25 to 2.3 inches. Also, at the point where the major axis X intersects the end curved sections 66, 68 of the peripheral 54 and traversing ribs 90, the outer and inner surfaces of each of these ribs intersect the lowermost planar surface of the bottom panel 12 at their lower edges at an interior angle of approximately 15 to 50 degrees. This configuration aids in preventing buckling and uniformly distributing the load across the bottom panel 12.

As shown in FIG. 3 and FIG. 7, interior to the peripheral rib 54 are a pair of curved returning ribs 108. Each returning rib 108 includes an inner surface 110 generally facing the central portion 60 of the bottom panel 12 and an outer surface 112 generally facing away from the central portion 60 of the bottom panel 12. The inner and outer surfaces 110, 112 of a returning rib 108 include respective upper edges 110a, 112a and respective lower edges 110b, 112b. At points of non-intersection, the upper edge 110a of the inner surface 110 interconnects with the upper edge 112a of the outer surface 112 at a full radius peak 114 having a radius of curvature of approximately 1/16 to 3/8 inch.

Each returning rib 108 has a first end 116 preferably intersecting a side curved section at a first intersection 118 and a second end 120 preferably intersecting the same side curved section at a second intersection 122. For example, one returning rib 108 has a first end 116 intersecting side curved section 62 and a second end 120 intersecting the same side curved section 62 at a second intersection 122. The returning rib 108 preferably does not traverse the interior panel 58 but extends toward the central portion 60 and curves through a point of inflection 124 returning to intersect the same side curved section. The returning ribs 108 are preferably centrally located along the side curved sections 62, 64. Alternatively, intersections 118, 122 may be located at corners 70. Also, any combination of intersections 118, 122 of the returning rib with either the side or end curved sections 62, 64, 66, 68, or corners 70 is possible without departing from the spirit and scope of the present invention.

The configuration of the returning ribs 108 is such that the minor axis Y is substantially normal to lines tangent to each point of inflection 124. Also, the minor axis Y substantially bisects both side curved sections 62, 64 of the peripheral rib 54 and both returning ribs 108. This configuration in which the minor axis Y crosses a total of four ribs provides enhanced beam strength to prevent buckling along the minor axis Y. At the point where the minor axis intersects the side curved sections 62, 64 of the peripheral 54 and returning ribs 108, the width of each of these ribs as measured from the lower edge of its inner surface to the lower edge of its outer surface is approximately 0.25 to 2.3 inches. Also, at the point where the minor axis Y intersects the side curved sections 62, 64 of the peripheral 54 and returning ribs 108, the outer and inner surfaces of each of these ribs intersect the lowermost planar surface of the bottom panel 12 at their lower edges at an interior angle of approximately 15–50 degrees. This configuration aids in uniformly distributing the load across and preventing the buckling in the bottom panel 12.

The peripheral rib 54 and the interior ribs 56 prevent the foil container 10 and its bottom panel 12 from flexing downward when the container 10 is loaded with product. As a result, the peripheral rib 54 and the interior ribs 56 provide the foil container 10 with increased bending strength. In addition to providing structural rigidity, the peripheral rib 54 and the interior ribs 56 can serve to lift a food product (e.g., ham, roast, turkey, etc.) in the container 10 out of its own juices as well as minimize surface contact of the food product with the aluminum bottom panel 12 to reduce sticking. By lifting the food product out of its own juices, the ribs 54, 56 promote uniform cooking of the food product and prevent the food product from absorbing excessive fat. Also, the rib configuration cradles the food product within the central portion 60. This cradling action of the ribs helps prevent a heavy piece of food product from suddenly shifting and splashing liquid as the food product is transported in the container 10.

The peripheral rib 54 and the interior ribs 56 are sufficiently deep to raise the food product and comprised of a cross-sectional shape to distribute weight and resist deflection. However, rib intersections generally include flattened top areas due to forming constraints inherent in the foil gauge and elongation capacity. Flat top areas are formed at intersections 102, 106, 118, 122 of the interior ribs 56 with the peripheral rib 54.

Flat top areas 126 are formed at intersections 102, 106 of the traversing ribs 90 with the side curved sections 62, 64 respectively. Since the rib configuration is symmetrical about the major and minor axes, only the flat top area 126 at intersection 102 is described. At intersection 102, the first end 98 of the traversing rib 90 blends into the side curved section 62. The inner surface 92 of the traversing rib 90 forms a smooth curvilinear transition into the inner surface 72 of the side curved section 62 forming a corner 128. The outer surface 94 of the traversing rib 90 forms a smooth curvilinear transition into inner surface 72 of the side curved section 62 forming a corner 130. Corner 130 is proximate to corner 70 of the peripheral rib 54. Upper and lower edges 92a, 92b interconnect with upper and lower edges 72a, 72b, respectively, and upper and lower edges 94a, 94b interconnect with upper and lower edges 72a, 72b, respectively, at respective smooth curvilinear corners 128 and 130. The flat top area 126 is generally defined by the area substantially enclosed by the intersecting upper edges 72a and 92a at corner 128, the intersecting upper edges 72a and 94a at corner 130, and the upper edge 80a. These three boundaries are capable of enclosing a area which defines the approximate surface area of the flat top which is approximately between 0.1 and 0.3 in$^2$.

To minimize the flat top area 126 and still provide for a formable panel within the constraints of the elongation capacity of the foil gauge and design considerations including number, size, and shape of the ribs, the width of the traversing ribs 90 is not uniform. At locations adjacent to first and second ends 98, 100 at intersections 102 106, respectively, the width of the traversing rib 90 as measured from lower edge 92b to lower edge 94b decreases. In particular, the width of the inner surface 92 as defined by the distance between the lower edge 92b and upper edge 92a decreases. Also at locations proximate to intersections 102, 106, the inclination of the inner surface 92 generally increases before decreasing at corners 128 in order to provide a geometry that will not result in cracking of the aluminum at the intersection when the container is formed. The inclination at corner 130 also decreases for the same reasons.

Other flat top areas 132 are formed at intersections 118, 122 of the returning ribs 108 with the side curved sections 62, 64. Since the rib configuration is symmetrical about the major and minor axes, only the flat top area 132 at intersection 118 is described. At intersection 118, the first end 116 of the returning rib 108 blends into the side curved section 62. The inner surface 110 of the returning rib 108 forms a smooth curvilinear transition into the inner surface 72 of the side curved section 62 is forming a corner 134. The outer surface 112 of the returning rib 108 forms a smooth curvilinear transition into inner surface 72 of the side curved section 62 forming a corner 136. Upper and lower edges 110a, 110b interconnect with upper and lower edges 72a, 72b, respectively, and upper and lower edges 112a, 112b interconnect with upper and lower edges 72a, 72b, respectively, at respective smooth curvilinear corners 20 134 and 136. The flat top area 132 is generally defined by the area substantially enclosed by the intersecting upper edges 72a and 110a at corner 134, the intersecting upper edges 72a and 112a at corner 136, and the upper edge 80a. These three boundaries are capable of enclosing a circular area which defines an approximate surface area of the flat top which is approximately between 0.1 and 0.3 in$^2$.

To minimize the flat top area 132 and still provide for a formable panel within the constraints of the elongation capacity of the foil gauge and design considerations including number, size and shape of the ribs, the width of the returning ribs 108 is not uniform. At locations adjacent to the first and second ends 116, 120 at intersections 118, 122, the width of the returning rib 108 as measured from lower edge 110b to 112b decreases. In particular, the width of the outer surface 112, as defined by the distance between the lower edge 112b and upper edge 112a, decreases. Also at locations proximate to intersections 118, 122 the inclination of the outer surface 112 generally increases before decreasing at corners 136 in order to provide a geometry will not result in the cracking of aluminum foil when the container is formed. The inclination at corner 134 also decreases for the same reasons.

The length of inner surfaces 72 located between intersections 102 and 118, 122 and 102, 106 and 122, 118 and 106 define leg portions 138. The leg portions 138 of the planar inner surface 72 have a greater inclination and a decreased width as measured from lower edge 72b to upper edge 72a to accommodate forming considerations associated with the given geometry of locating two intersections in close proximity.

Another strength-enhancing feature of the foil container 10 is the configuration of the periphery of the bottom panel 12. The periphery of the bottom panel 12 includes a step 140. The step 140 encompasses the peripheral rib 54 and forms a stepup transition from the bottom panel 12 to the lower edge of the continuous wall panel 14. The step 140 provides additional buckling resistance.

While the present invention has been described with reference to one or more particular embodiments, those skilled in the art will recognize that many changes may be made thereto without departing from the spirit and scope of the present invention. For example, a skeletal handle assembly may be fixedly secured to the disposable foil container 10 in order to further reinforce the container 10. One such handle assembly is described and illustrated in U.S. Pat. No. 5,029,721 to Timpe, which is incorporated herein by reference. Each of these embodiments and obvious variations thereof is contemplated as falling within the spirit and scope of the claimed invention, which is set forth in the following claims.

What is claimed is:

1. A disposable metal container comprising:
 a non-circular bottom panel having a peripheral rib enclosing an interior panel having a central portion, at least a first and second curved traversing rib, and at least a first and second curved returning rib, the peripheral rib having first and second side curved sections and first and second end curved sections, each of the traversing ribs extending between the first side curved section of the peripheral rib and the second side curved section of the peripheral rib, each of the traversing ribs being curved away from its nearest respective end curved section of the peripheral rib, the first returning rib extending from the first side curved section of the peripheral rib toward the central portion and returning to the first side curved section, the second returning rib extending from the second side curved section of the peripheral rib toward the central portion and returning to the second side curved section wherein the traversing ribs do not intersect with the returning ribs; and
 a continuous wall panel encompassing the non-circular bottom panel and extending upwardly from the bottom panel, the continuous wall panel forming a pair of opposing side walls and a pair of opposing end walls.

2. The container of claim 1, wherein the bottom panel is formed about major and minor axes, the major axis passing through the first and second end curved sections of the peripheral rib, the minor axis passing through the first and second side curved sections of the peripheral rib.

3. The container of claim 2, wherein the first and second returning ribs are symmetrical about the major axis.

4. The container of claim 2, wherein the first and second returning ribs are directly across from one another.

5. The container of claim 2, wherein the first and second traversing ribs are symmetrical about the major axis.

6. The container of claim 2, wherein the first and second traversing ribs are directly across from one another.

7. The container of claim 2, wherein the first and second returning ribs bisect the minor axis.

8. The container of claim 2, wherein the first and second traversing ribs bisect the major axis.

9. The container of claim 1, wherein the first and second side curved sections of the peripheral rib intersect the first and second end curved sections of the peripheral rib at respective corners, the traversing ribs intersecting the peripheral rib near the respective corners to form first intersections.

10. The container of claim 9, wherein each of the first intersections has a generally flat top surface.

11. The container of claim 1, wherein the returning ribs intersect the peripheral rib to form second intersections.

12. The container of claim 11, wherein each of the second intersections has a generally flat top surface.

13. The container of claim 1, wherein the continuous wall panel includes an upper edge and a continuous rim, the rim extending laterally outward from the upper edge.

14. The container of claim 13, wherein the continuous rim includes a pair of substantially straight end rim portions and a pair of substantially straight side rim portions, the end rim portions connected to upper end edges of the continuous wall panel, the side rim portions connected to upper side edges of the continuous wall panel, the side rim portions having three interconnected segments.

15. The rim of claim 13, wherein the continuous rim includes an inner planar flange, a declining middle planar flange, and an outer reinforcing bead, the inner planar flange projecting laterally from the upper edge of the continuous wall panel and being intermittently located along the continuous rim, the declining middle planar flange being continuously located along the continuous rim, encompassing the inner planar flange and being declined relative to the inner planar flange, the outer reinforcing bead being integrally formed with the middle planar flange and forming a coil which is continuous and encompasses the middle planar flange.

16. The container of claim 1, wherein the container is formed from a single sheet of metal.

17. The container of claim 1, wherein the bottom panel includes exactly two returning ribs.

18. The container of claim 1, wherein the bottom panel includes exactly two traversing ribs.

19. The container of claim 1, wherein the bottom panel includes exactly two traversing ribs and exactly two traversing ribs.

20. The container of claim 1, wherein each returning rib includes a first surface that extends inwardly toward the central portion of the bottom panel and a second surface that extends outwardly from the central portion of the bottom panel, the first and second surfaces being integrally connected to a point of inflection.

21. The container of claim 1, wherein each traversing rib includes a first surface that extends inwardly toward the central portion of the bottom panel and a second surface that extends outwardly from the central portion of the bottom panel, the first and second surfaces being integrally connected to a point of inflection.

22. The container of claim 1, wherein each of the peripheral ribs, traversing ribs, and returning ribs project upwardly from the bottom panel and have generally rounded top surfaces, each of said peripheral ribs, traversing ribs, and returning ribs having sides that slope away from their respective top surfaces.

23. A disposable metal container comprising:
- a non-circular bottom panel having a peripheral rib enclosing an interior panel having a central portion, at least a first and second curved traversing rib, and at least a first and second curved returning rib, the peripheral rib having first and second side curved sections and first and second end curved sections, the bottom panel being formed about major and minor axes, the major axis passing through the first and second end curved sections of the peripheral rib, the minor axis passing through the first and second side curved sections of the peripheral rib, each of the traversing ribs extending between the first side curved section of the peripheral rib and the second side curved section of the peripheral rib, each of the traversing ribs curved away from the respective end curved sections of the peripheral rib, the first returning rib extending from the first side curved section of the peripheral rib toward the central portion and returning to the first side curved section, the second returning rib extending from the second side curved section of the peripheral rib toward the central portion and returning to the second side curved section, wherein the traversing ribs do not intersect the returning ribs; and
- a continuous wall panel encompassing the non-circular bottom panel and extending upwardly from the bottom panel, the continuous wall panel forming a pair of opposing side walls and a pair of opposing end walls, the continuous wall panel including an upper edge and a continuous rim, the rim extending laterally outward from the upper edge of the continuous wall panel.

24. The container of claim 23, wherein the container includes exactly two returning ribs.

25. The container of claim 23, wherein the container includes exactly two traversing ribs.

26. The container of claim 23, wherein the first and second returning ribs are symmetrical about the major axis and are directly across from one another.

27. The container of claim 23, wherein the first and second traversing returning ribs are symmetrical about the major axis and are directly across from one another.

* * * * *